United States Patent [19]
Feinberg et al.

[11] 4,024,600
[45] May 24, 1977

[54] ROLLER UNITS

[75] Inventors: Irving Feinberg, Saddle Brook; Carl Friedrich, Union, both of N.J.

[73] Assignee: Presto Lock Company, division of Walter Kidde & Company, Inc., Elmwood Park, N.J.

[22] Filed: July 21, 1975

[21] Appl. No.: 597,755

[52] U.S. Cl. .............................. 16/31 R; 190/18 A; D8/375
[51] Int. Cl.² ........................................ B60B 33/00
[58] Field of Search ............... 16/18 R, 30, 40, 21, 16/24, 27, 31 R; 280/79.1, 79.2, 79.3, 47.13; 190/18 A; D88/226, 227

[56] References Cited

UNITED STATES PATENTS

| | | | |
|---|---|---|---|
| 260,728 | 7/1882 | Cowell | 16/40 |
| 394,310 | 12/1888 | Sullivan | 16/31 R |
| 790,748 | 5/1905 | Rangnow | 190/18 A |
| 1,969,557 | 8/1934 | Hevold | D8/226 X |
| 2,186,724 | 1/1940 | Harris | 16/31 R X |
| 2,524,236 | 10/1950 | Schultz, Jr. | 16/31 R |
| 2,691,793 | 10/1954 | Jacobs | 16/18 R |
| 2,964,778 | 12/1960 | Frey | 16/21 |
| 3,987,875 | 10/1976 | Szabo | 190/18 A |

*Primary Examiner*—Werner H. Schroeder
*Assistant Examiner*—Conrad L. Berman
*Attorney, Agent, or Firm*—Shapiro and Shapiro

[57] ABSTRACT

A roller unit for use as a caster for luggage, for example, has a sturdy one-piece roller housing formed of sheet metal, the housing comprising a rectangular base with raised pads at opposite ends thereof and a roller-receiving shell defined by a pair of opposed U-shaped walls bent from opposite longitudinal edge regions of the base between the pads. Roller units are manufactured seriatim by metal forming operations that do not require deep-drawing.

9 Claims, 8 Drawing Figures

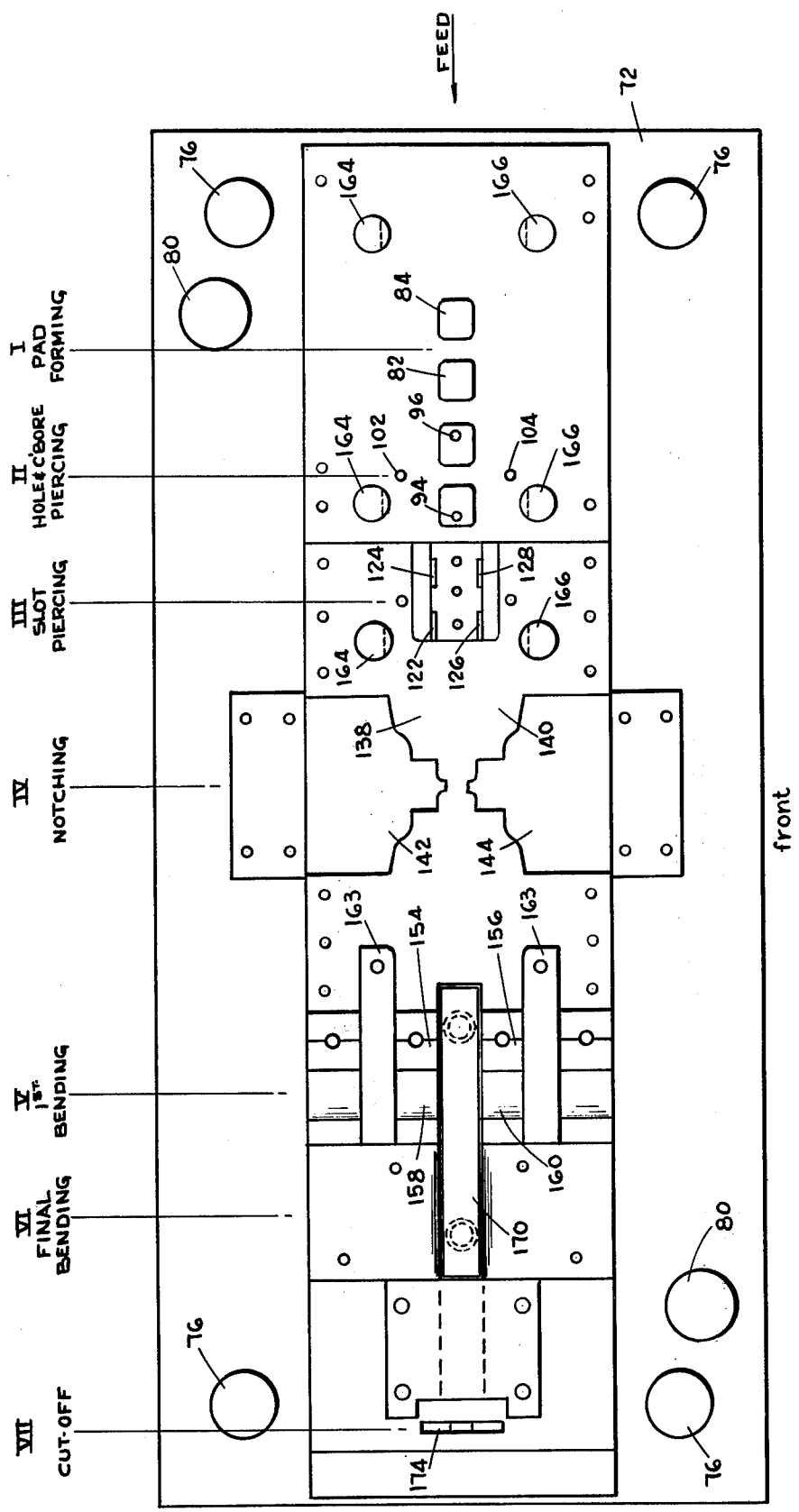

ROLLER UNITS

BACKGROUND OF THE INVENTION

This invention is concerned with roller units, particularly roller units that may be employed as casters for luggage.

One type of roller unit employed heretofore as a caster for luggage comprises a one-piece metal housing having a roller-receiving shell formed by a series of metal working operations which draw the shell from a metal strip and bring it to size gradually. At the end of the draw a final trim-out provides the proper shell opening, and then an additional piercing or drilling operation produces holes in the shell for a shaft on which the roller rotates. This type of roller unit has certain disadvantages, including the following: the base of the unit has a hole where the shell is drawn from the base; the metal of the formed shell is thinned out due to the drawing operation; secondary operations are required for trimming out and hole-piercing or drilling. Other types of roller units have other disadvantages, such as housings with multiple parts that must be assembled, or housings that have insufficient strength.

BRIEF DESCRIPTION OF THE INVENTION

It is accordingly an object of the present invention to provide improved roller units and improved methods of manufacturing the same.

More specifically, it is an object of the invention to provide roller units in which a one-piece sheet metal housing comprises a base and a shell, and in which the shell is manufactured without forming an opening in the base and without thinning out the metal, as would occur in metal forming by deep drawing.

Briefly stated, a roller unit in accordance with the invention comprises a housing of sheet metal having a base and a roller-receiving shell, the shell including wall means bent from an edge of the base and extending substantially transversely to the base. In the manufacture of the roller unit, a base and a pair of wings are formed from sheet metal, the wings being integral with the base and extending outwardly of the base from opposite edges thereof. The wings are formed into a shell substantially perpendicular to the base by bending the wings relative to the base at said edges and by making each wing substantially U-shaped, with arms extending toward corresponding arms of the other wing and overlapping the base.

BRIEF DESCRIPTION OF THE DRAWINGS

The invention will be further described in conjunction with the accompanying drawings, which illustrate preferred and exemplary embodiments, and wherein:

FIG 6. is a top plan view of die apparatus which may be employed in the manufacture of the roller units of the invention.

DETAILED DESCRIPTION OF THE INVENTION

Figure 1:
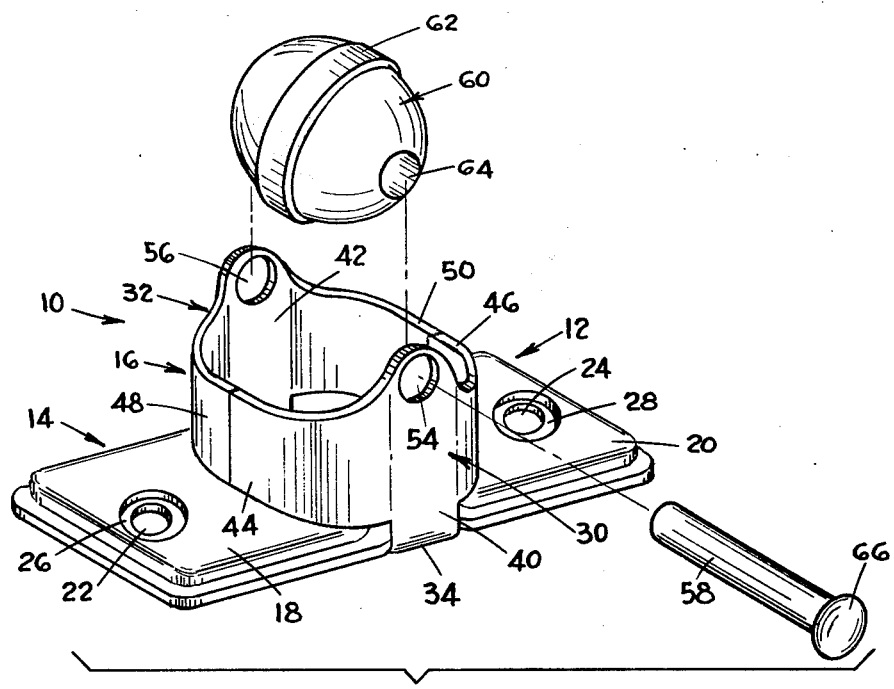
FIG. 1 is an exploded perspective view of a roller unit in accordance with the invention, the unit being shown inverted from its usual operative position.

Referring to the drawings, and initially to FIGS. 1–4 thereof, a roller unit 10 of the invention comprises a one-piece metal housing 12 having an elongated base 14 and a shell 16 integral therewith. In the form shown the base 14 is generally rectangular and has a pair of rectangular up-raised pads 18 and 20 at opposite ends thereof. Each pad is provided with a bore 22 or 24 countersunk at 26 or 28 in a direction opposite to the up-raising of the pads 18 and 20. The bores 22 and 24 receive fasteners (not shown) such as rivets or the like for attaching the base 14 to an object such as a piece of luggage. The roller units will usually be employed in pairs. One pair of roller units constructed in accordance with the invention may support one end of a suitcase, for example, while swivel roller units of conventional type may support the other end.

The shell 16 comprises a pair of walls 30 and 32 which are bent from opposite longitudinal side edge regions 34 and 36 of the base 14. In the preferred form illustrated, the central region 38 of the base is substantially flat (see FIG. 4) rather than up-raised like the pads 18 and 20, and the central stems 40 and 42 of the walls 30 and 32 are extensions of the central region 38 of the base separating the pads 18 and 20. The pad perimeters are defined by edge regions of the base and by the central region 38.

Each wall 30 or 32 is substantially U-shaped in cross section in a plane parallel to the base 14 and has a pair of arms 44, 46 or 48, 50 projecting oppositely from the central stem 40 or 42, with the arms of one wall extending toward and mating with corresponding arms of the other wall and overlapping the base 14 to form the shell 16, which is substantially perpendicular to the base 14. The opposing ends of the corresponding arms of the walls 30 and 32 mate, but need not actually touch each other.

The shell 16 is preferably oval in cross section in a plane parallel to the base 14, with the longer cross dimension of the oval in the direction of the width (shorter cross dimension) of the base 14. The end of the shell 16 adjacent to the base is defined in part by edges of the arms 44–50, which may be slightly spaced from the base as shown at 52 in FIGS. 2, 3, and 4. In the illustrative form of the invention the end of the shell 16 adjacent to the base is substantially flat. However, the opposite end of the shell 16, away from the base 14, is preferably contoured as shown, with each wall 30 or 32 having its greatest cross dimension away from the base 14 at the central stem 40 or 42 of the wall. The peaks of the walls 30 and 32, which project away from edges of the base, are provided with aligned bores 54 and 56 for receiving a pin or rivet 58 which serves as the axle of a roller 60. The roller, which may be formed of a hard plastic material, for example, may be generally ellipsoidal and may be molded with an annular "tire" 62 at the central region which engages the ground. Pin 58 is inserted through bores 54, 56 and through a central bore 64 of roller 60, one end of the pin having a head 66 too large to pass through the opening 54 and the other end of the pin being flattened as shown at 68 in FIG 3 so as to provide removal of the pin. Bore 64 of the roller is made just large enough to permit free rotation of the roller upon pin 58.

Figure 2:
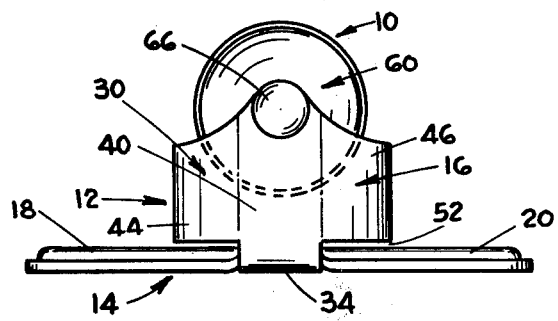
FIG. 2 is a side elevation view of the roller unit of FIG. 1 with the parts shown fully assembled.
Figure 3:
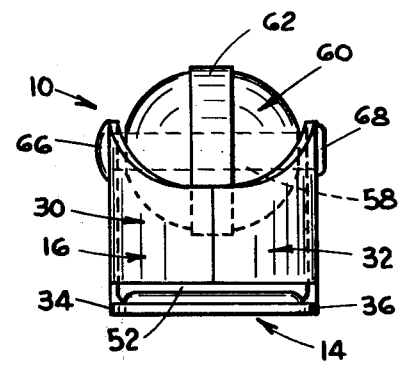
FIG. 3 is an end elevation view of the roller unit.
Figure 4:
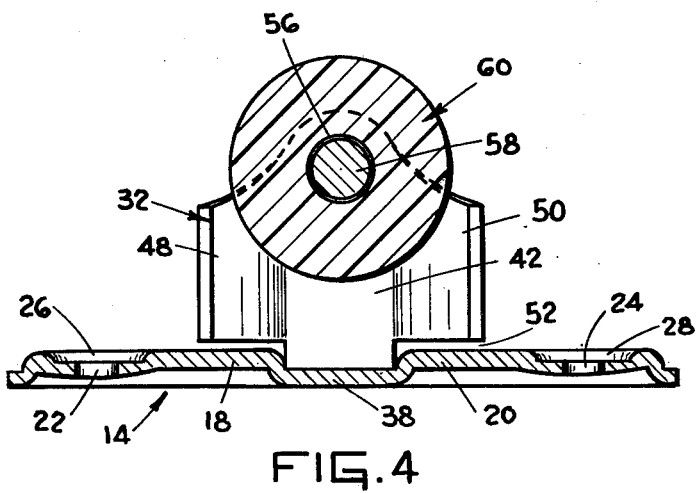
FIG. 4 is a longitudinal sectional view of the roller unit.

It is apparent from FIGS. 2–4 that when the roller 60 is mounted within the shell 16, it is sufficiently spaced from the walls of the shell and from the base 14 to provide freedom of rotation even if some debris or other foreign matter becomes lodged in the shell. The aforesaid contouring of the edge of the shell away from the base exposes a major portion of the roller surface and provides sufficient clearance with respect to the shell to permit the removal of any accumulated foreign matter. Space 52 previously referred to assists in this regard.

The one-piece housing 12 of the invention is stronger than U-shaped housings commonly employed for casters, and avoids the need for a separate cup-shaped piece previously employed to provide a roller-receiving shell. Since the housing 12 can be manufactured without employing deep-drawing operations, it does not suffer from thinned out metal and a hole in the base, which characterize deep-drawn housings. Instead, the housing has substantially the same thickness throughout the base and the shell, and the base is closed adjacent to the shell.

Figure 5A:
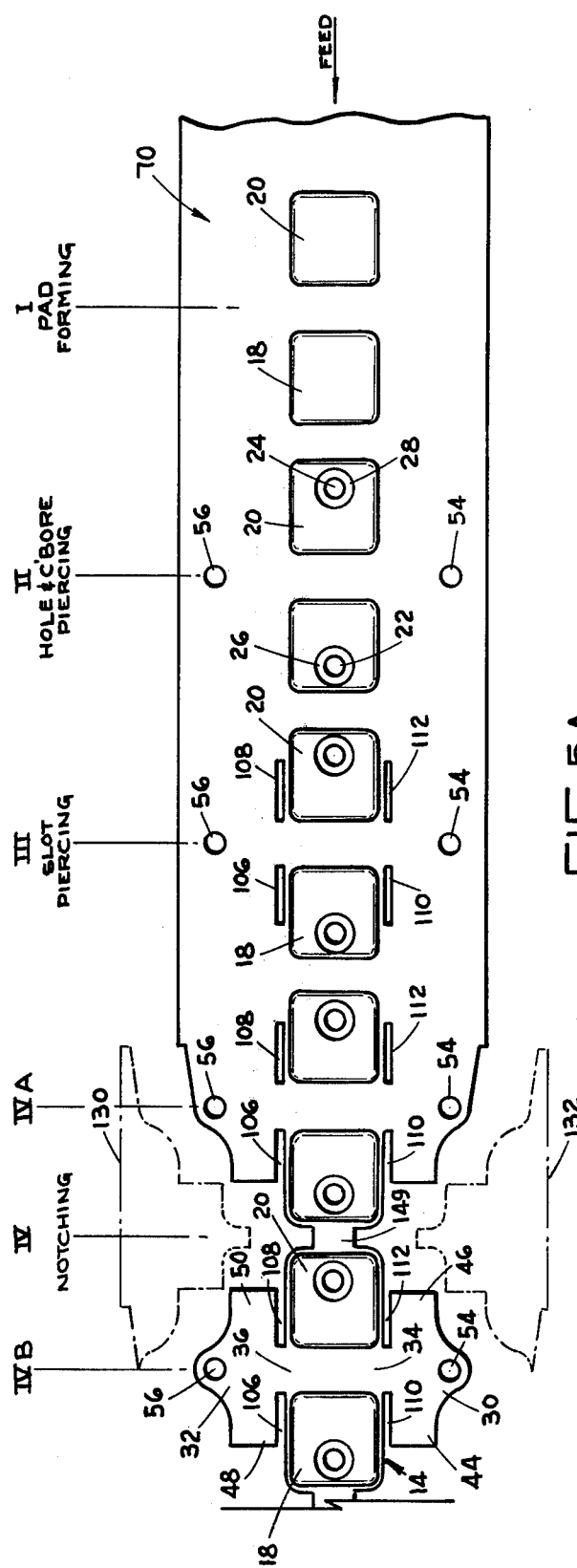
FIGS. 5A and 5B are plan views which together illustrate successive steps in the manufacture of roller units in accordance with the invention.
Figure 5B:
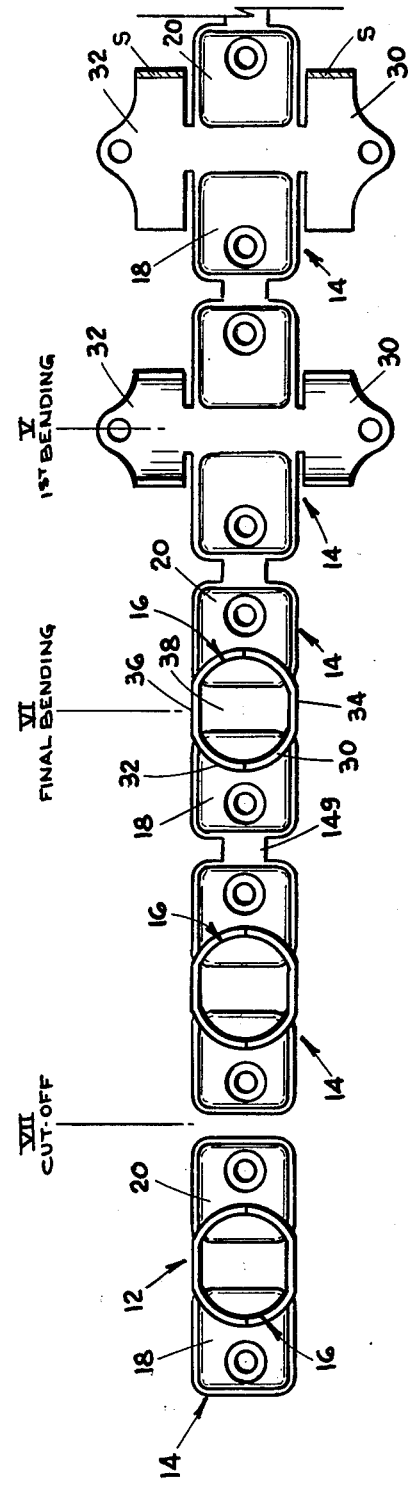
Figure 7:
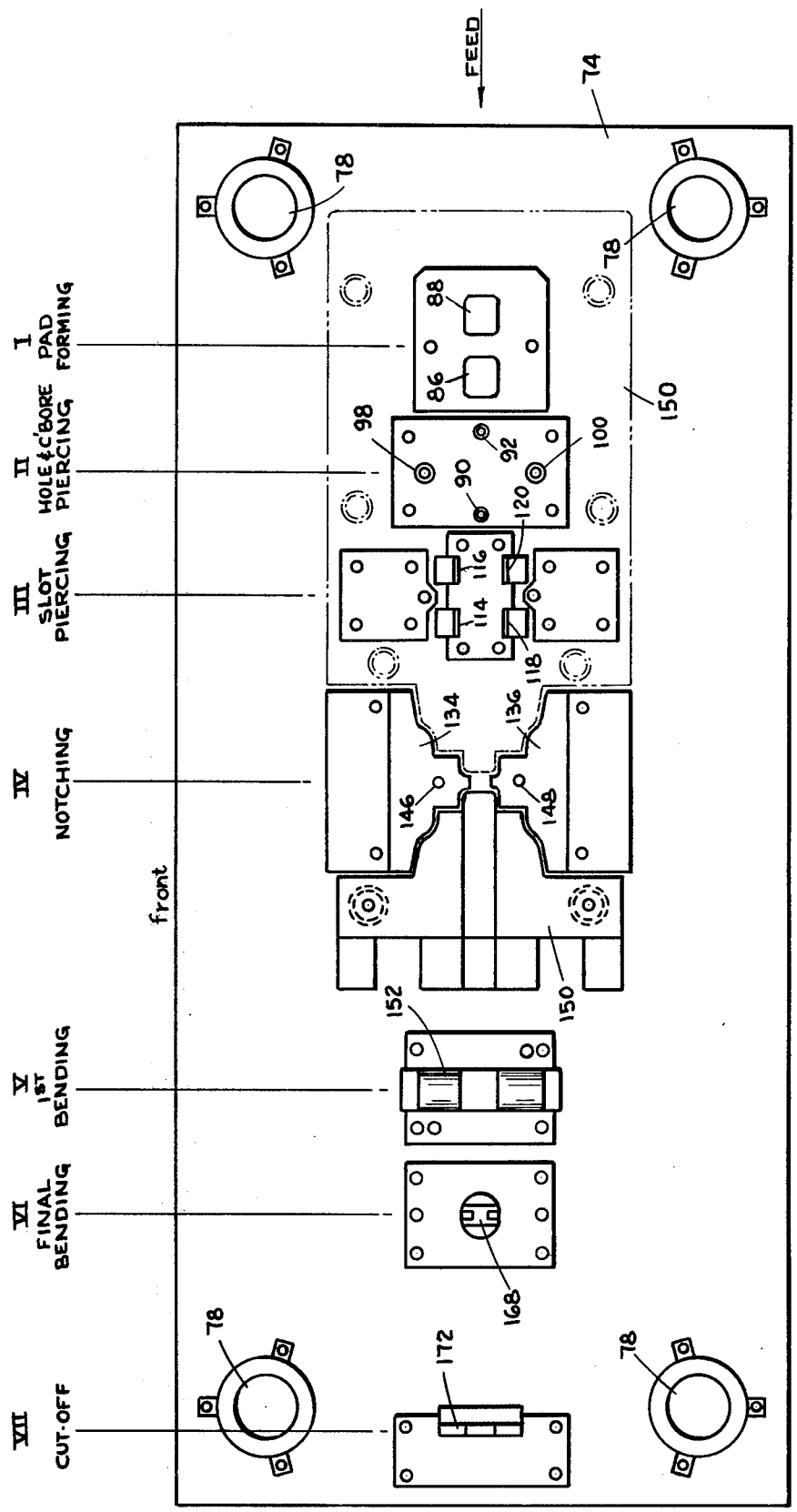
FIG 7. is a bottom plan view of punch apparatus which cooperates with the die apparatus of FIG. 6.

FIGS. 5A and 5B illustrate a preferred method of manufacturing roller unit housings 12 of the invention. The right end of FIG. 5B is an extension of the left end of FIG. 5A, the figure being divided into two parts for purposes of illustration on a single sheet without undesirable size reduction. The housings are preferably manufactured seriatim by feeding a strip 70 of metal sheet or plate stock progressively, step-by-step, through a punch and die set, which will be referred to more fully hereinafter. The metal strip may be of appropriate thickness, for example, or other metal having sufficient strength to form a roller housing and capable of being worked in the manner to be described. As the strip 70 is fed from right to left in FIGS. 5A and 5B, the following designated operations are performed at corresponding stations of the punch and die apparatus:

I. Pad forming
II. Hole and counterbore piercing
III. Slot piercing
IV. Notching
V. First bending
VI. Final bending
VII. Cut-off FIGS. 6 and 7 illustrate, respectively, die apparatus and punch apparatus which together constitute a punch and die set of the type preferably employed for performing the foregoing designated operations. The die in FIG. 6 is seen from above, in its normal operative position, while the punch of FIG. 7 is shown inverted for purposes of illustration, the front of the punch designated in FIG. 7 appearing at the top of the figure, and the front of the die designated in FIG. 6 appearing at the bottom of the figure. The working parts of the die and the punch are conventionally supported on holders 72 and 74, respectively. In operation the punch holder 74 moves toward and away from the die repetitively, guide posts 76 at the corners of the die holder 72 sliding in corresponding guide bushings 78 at the corners of the punch holder 74 to guide the vertical reciprocating movement of the punch, which is limited by stops 80.

Referring now to FIGS. 6 and 7 in conjunction with FIGS. 5A and 5B, at Station I of the punch and die set, the pads 18 and 20 are embossed to the necessary height and shape. Up-raised pad-forming members 82 and 84 of the die are encircled by recessed pad areas 86 and 88 of the punch holder. Tight clearance is maintained along the edges to give clean, sharp lines.

At Station II the pad areas 18 and 20 are pierced and embossed downwardly to provide a hole and counterbore recess 22, 26 or 24, 28 in each pad area. At the same time near the outer edges of the stock strip additional holes 54 and 56 are pierced. The counterbore punches 90 and 92 of FIG. 7 have shoulders that provide the embossed counterbores. The die underneath is recessed at 94 and 96 to enable the embossed metal to move downward, the central portions of the metal in the recesses being punched out, of course. The piercing of holes 54 and 56 employs straight punches 98 and 100 cooperating with holes 102 and 104 in the die.

At Station III four slots 106, 108, 110, and 112 are punched from the metal strip 70 by slot punches 114, 116, 118, and 120 cooperating with die openings 122, 124, 126, and 128. The slots serve to delineate the width dimension of the base 14 of the roller housing and at the same time to free up the metal for the bends necessary to form the shell 16 of the finished piece. The slots do not provide the full side edge of the base, however, the provision of slots at this point in the manufacturing process facilitates the punching out of larger areas at the next station. Holes 54 and 56 serve as pilot holes at the slot piercing Station III and at subsequent stations. A blunt nosed punch enters each hole prior to any piercing or forming at the stations. This provides perfect line-up of piercings, embossings, etc., based on a definite step from one station to the next.

At Station IV notching (piercing) is perfomed at opposite sides of the strip 70, with removal of the odd-shaped metal pieces 130 and 132. The piercing forms base and wing edges in two strips IVA and IVB. As pieces 130 and 132 are removed, leading edges of the base and wings of a housing are defined at IVA (and trailing edges of the preceding housing at IVB). When the next pieces 130 and 132 are removed, trailing edges are defined at IVB (and leading edges of the next housing at IVA). As shown, the piercings at Station IV blend in with the slot piercings at Station III, so that each slot is opened at one end thereof. The large piercing operation at Station IV is accomplished by having the necessary heavy punches 134 and 136 mounted on the punch holder and cooperating with cutting edges of inserts 138 and 140 in the die block, which are used instead of cutting edges in the die block itself so that it is easy to renew the cutting edges without changing the die block itself. The die openings are shown at 142 and 144 in FIG. 6. Spring loaded pins 146 and 148 in the punch may be employed to assist in removing pieces 130 and 132.

The notching operation at Station IV and the slots 106–112 define the complete edge contours of the base 14 of the roller housing, except for the bridge pieces 149. Also defined are the walls 30 and 32 (including arms 44–50), which at this point in the manufacturing process are merely flat wings projecting outwardly from central side edge regions 34 and 36 of the base 14 in the same plane as the base. It will be noted that pilot holes 54 and 56 are now positioned in the wings.

Up to a position between Stations IV and V, we have held the stock firmly against the face of the die holder by means of a spring loaded stripper plate 150 which is in two sections (one of which is shown in phantom for the purpose of clarity in illustration) and is mounted on the punch holder by means of shouldered screws. Eight springs exert pressure against this stripper to create a firm hold on the stock while the operations are being performed. In FIG. 5B the shaded regions S show the final contact of the stripper plate with the stock strip before the fist bending operation.

At Station V the wings 30 and 32 are made U-shaped by means of a solid punch 152 extending down from the punch holder. Its height allows for a single metal thickness between its lower surface and the surface of the die. Its shape resembles the inner contours of the formed wings. The center of the forming area at Station V is cut out to match the width of the base of the housing. Extending upward from the die is a spring loaded pad 170 with a flat facing. This pad exends slightly above the forming die at Station V. Thus when the punch comes down to form the wings, it first pushes the stock against this forming pad to clamp it. Further downward travel pushes the wings 30 and 32 against the forming die 158, 160 to give them their outside contour, while the forming punch gives them their inside shape. Bars 163 effectively confine the stock strip 70 between their inner edges. The strip was earlier confined by means of six rollers 164 and 166 mounted on the die in the area up to Station IV. This assures the formation of the wings upward at a true 90° angle. The spring loaded pad 170 extending between Stations V and VI is exactly the size of the finished width of the path.

At Station VI the wings are bent upward (at right angles to the base 14) so as to mate with one another at the center of the base. This completes the shell 16 which ultimately receives the roller 60. To perform this operation a round shaped punch 168 extends downwardly from the punch holder. It is the same height as the punch of Station V and its face is contoured to match the pad areas at the bottom of the housing shell.. Both punches in Stations V annd VI strike the stock simultaneously, clamping the stock between their faces and the upstanding forming pad 170 previously mentioned. The die area at Station VI is the same size as the forming pad. When the punch strikes the wings forcing them to go down further, the wings bend inward as they enter the die area, while the spring pad continues to move down. Thus both of Stations V and VI have similar pad movement.

At the end Staton VII, a simple blade punch 172 cooperating with a cut-off die 174 chops out the small bridge piece 149 which ties the roller housing to the strip.

The roller housings, which may be chrome plated or otherwise conventionally surface finished, are then assembled with rollers in the manner described previously.

While preferred embodiments of the invention have been shown and described, it will be apparent to those skilled in the art that changes may be made without departing from the principles and spirit of the invention, the scope of which is defined by the following claims.

We claim:

1. A unit adapted to receive a roller comprising a housing of sheet metal having an elongated base and a roller-receiving shell, the base having an opening on each side of the shell to receive fastening means for the unit, the shell including a pair of walls integral with the bent from opposite edges of the base, each of the walls having a central stem and a pair of arms projecting from each stem and overlapping the base, the arms of one wall extending toward and mating with the corresponding arms of the other wall.

2. A unit in accordance with claim 1, wherein said housing has substantially the same thickness throughout said base and said shell.

3. A unit adapted to receive a roller in accordance with claim 1, further comprising a pair of aligned openings through said central stems and a roller supported for rotation in said shell on an axle extending through said openings.

4. A unit in accordance with claim 1, wherein said base has a central region from which said walls are bent and has pad regions at opposite sides of said central region which are up-raised toward said shell.

5. A unit in accordance with claim 4, wherein each pad region has said opening therethrough countersunk in a direction opposite to the up-raising thereof.

6. A unit in accordance with claim 4, wherein said pad regions have perimeters defined by edge regions of said base and by said central region of said base.

7. A unit in accordance with claim 6, wherein said base and said pad regions are substantially rectangular.

8. A unit in accordance with claim 1, further comprising means including a pair of aligned openings through said walls, respectively, for supporting a roller in said shell.

9. A unit in accordance with claim 8, wherein said shell has peaks projecting transversely away from said edges of said base, wherein said openings are located adjacent to said peaks, and wherein a roller is supported for rotation in said shell on an axle extending through said openings.

* * * * *

UNITED STATES PATENT AND TRADEMARK OFFICE
CERTIFICATE OF CORRECTION

PATENT NO. : 4,024,600
DATED : May 24, 1977
INVENTOR(S) : Irving Feinberg and Carl Friedrich It is certified that error appears in the above-identified patent and that said Letters Patent are hereby corrected as shown below:

Column 2, line 66, "provide" should read --prevent--;

Column 3, line 32, after "be" insert --steel--;

Column 4, line 34, "strips" should read --steps--;

Column 5, line 27, "path" should read --part--;

Column 5, line 45, "Staton" should read --Station--; and

Column 6, line 14, "the" (second occurrence) should read --and--.

Signed and Sealed this sixteenth Day of August 1977

[SEAL]

Attest:

RUTH C. MASON
Attesting Officer

C. MARSHALL DANN
Commissioner of Patents and Trademarks